United States Patent
Gärtner

[11] Patent Number: 5,782,226
[45] Date of Patent: Jul. 21, 1998

[54] METHOD OF REDUCING THE HARMFUL EMISSIONS OF A MULTICYLINDER INTERNAL COMBUSTION ENGINE

[75] Inventor: Uwe Gärtner, Remshalden, Germany

[73] Assignee: Mercedes-Benz AG, Stuttgart, Germany

[21] Appl. No.: 858,434

[22] Filed: May 19, 1997

[30] Foreign Application Priority Data

May 29, 1996 [DE] Germany .................. 196 21 530.7

[51] Int. Cl.$^6$ .................. F02D 21/08; F02M 25/07
[52] U.S. Cl. .................................. 123/568
[58] Field of Search ................ 123/568, 569, 123/570, 571

[56] References Cited

U.S. PATENT DOCUMENTS

| | | | |
|---|---|---|---|
| 4,237,826 | 12/1980 | Motosugi et al. | 123/568 |
| 4,318,373 | 3/1982 | Soubis | 123/568 |
| 4,333,428 | 6/1982 | Tanaka et al. | 123/568 |
| 4,357,917 | 11/1982 | Aoyama | 123/568 |
| 4,393,853 | 7/1983 | Groves | 123/568 |
| 4,422,430 | 12/1983 | Wiatrak | 123/568 |
| 5,115,790 | 5/1992 | Kawamura | 123/568 |
| 5,203,310 | 4/1993 | Gatellier | 123/568 |
| 5,203,830 | 4/1993 | Faletti et al. | 123/568 |
| 5,224,460 | 7/1993 | Havstad et al. | 123/568 |
| 5,351,668 | 10/1994 | Gatellier | 123/568 |
| 5,558,070 | 9/1996 | Bell et al. | 123/568 |
| 5,603,292 | 2/1997 | Hakansson | 123/568 |
| 5,690,081 | 11/1997 | Kwiatkowski | 123/570 |

*Primary Examiner*—Willis R. Wolfe
*Attorney, Agent, or Firm*—Klaus J. Bach

[57] ABSTRACT

In a method for reducing harmful emissions of a multicylinder internal combustion engine including for each cylinder intake and exhaust passages with intake and exhaust valves and an exhaust gas recirculation passage extending between an exhaust passage and the interior of a cylinder and including an exhaust gas recirculation valve, the exhaust gas recirculation valve of a first cylinder is opened during the intake cycle of the first cylinder at the beginning of the exhaust cycle of a second cylinder associated with the first cylinder and the exhaust gas recirculation valve is closed when the exhaust gas pressure in the exhaust gas recirculation passage from the second cylinder to the first cylinder falls below the combustion chamber pressure in the first cylinder or the charge air pressure in its intake passage or when a predetermined amount of exhaust gas has been recirculated.

4 Claims, 2 Drawing Sheets

5,782,226

1

METHOD OF REDUCING THE HARMFUL EMISSIONS OF A MULTICYLINDER INTERNAL COMBUSTION ENGINE

BACKGROUND OF THE INVENTION

The invention relates to a method of reducing the harmful emissions of a multi-cylinder internal combustion engine with a cylinderhead having intake and exhaust passages and intake and exhaust valves and an exhaust gas recirculation valve mounted in the cylinder head of the engine for controllably recirculating exhaust gas.

U.S. Pat. No. 5,203,310 discloses a method for reducing the harmful emissions of an internal combustion engine. It discloses a multi-cylinder engine with an intake and an exhaust passage which includes in the cylinder head an exhaust gas recirculation passage with an exhaust gas recirculation valve for the control of the exhaust gas flow in the exhaust gas recirculation passage extending between the intake and exhaust passages or alternatively between the cylinder and the intake passage. The exhaust recirculation valve can be opened at the begin of an intake stroke of the respective cylinder wherein the begin and the duration of the exhaust gas recirculation can be controlled depending on the desired amount of exhaust gas to be recirculated and on the operating conditions of the engine.

However, it is a disadvantage that exhaust gas recirculation is not possible at any operating state of the engine. Particularly in the upper partial load range and during full load the average charge air pressure is greater than the average exhaust gas pressure. Then the pressure differential required for recirculating exhaust gas to the engine intake passage is not available.

Other known exhaust gas recirculation concepts provide, in operating ranges of the engine wherein the average charge air pressure exceeds the average exhaust gas pressure, for a throttling of the charge air or they utilize ejectors in order to obtain the pressure differential needed for exhaust gas recirculation. Such measures however are relatively expensive and, furthermore, require additional components and space in the engine compartment. For further technical background information reference is made to U.S. Pat. No. 5,351,668.

It is the object of the present invention to provide a simple and inexpensive method for recirculating exhaust gas over a substantially increased operating range of the internal combustion engine.

SUMMARY OF THE INVENTION

In a method for reducing harmful emissions of a multi-cylinder internal combustion engine including for each cylinder intake and exhaust passages with intake and exhaust valves and an exhaust gas recirculation passage extending between an exhaust passage and the interior of a cylinder and including an exhaust gas recirculation valve, the exhaust gas recirculation valve of a first cylinder is opened during the intake cycle of the first cylinder at the beginning of the exhaust cycle of a second cylinder associated with the first cylinder and the exhaust gas recirculation valve is closed when the exhaust gas pressure in the exhaust gas recirculation passage from the second cylinder to the first cylinder falls below the combustion chamber pressure in the first cylinder or the charge air pressure in its intake passage or when a predetermined amount of exhaust gas has been recirculated.

With the method according to the invention, exhaust gas recirculation is possible in operating ranges of the engine

2 wherein the average charge air pressure exceeds the average exhaust gas pressure (that is, for charged engines in the upper partial load or full load operating ranges) without additional measures for changing the pressure conditions such as throttling of the charge air. This is achieved by utilizing the pressure impulse in an exhaust gas stroke of a certain cylinder for the exhaust gas recirculation from this particular cylinder to another particular cylinder (cylinder-individual exhaust gas recirculation).

Another advantage of the invention resides in the fact that in an exhaust gas recirculation passage which provides for communication between an exhaust passage and the interior of a cylinder directly, the intake side including intake duct of the engine is totally separated from the exhaust side since during the suction stroke the exhaust gas recirculation valve opens directly into the cylinder. Consequently, contamination of the intake area of the engine and exhaust gas particle deposition therein are prevented.

Further advantages will become apparent from the description of the invention. The invention is described below in greater detail on the basis of the accompanying drawings.

DESCRIPTION OF AN EMBODIMENT OF THE INVENTION

Figure 1:
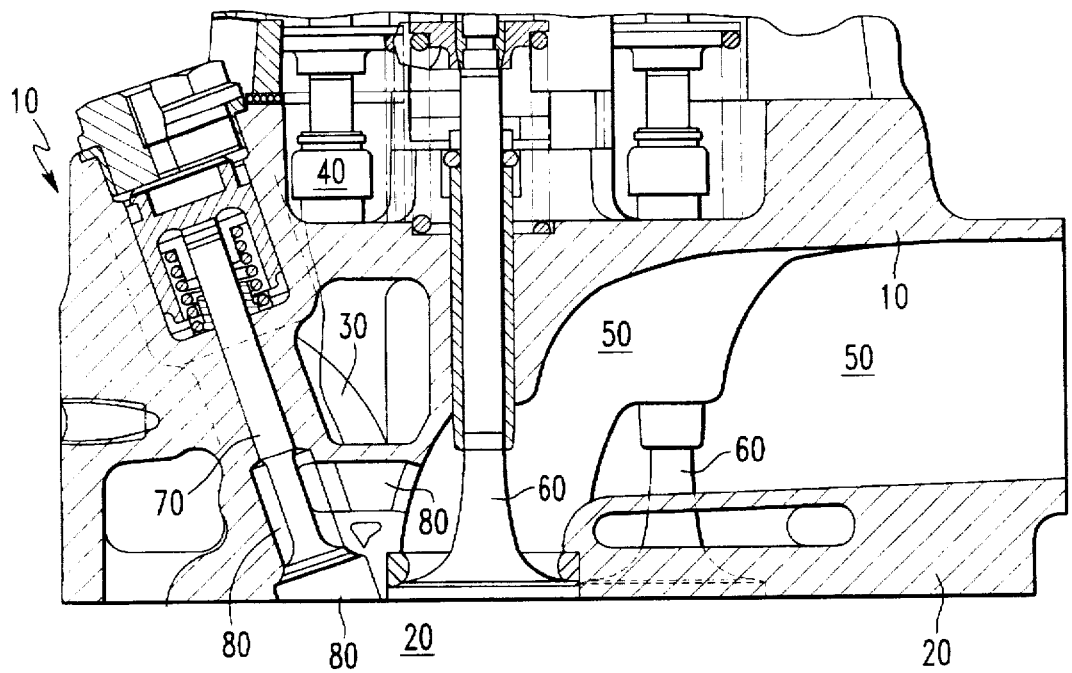
FIG. 1 shows an arrangement for performing the method according to the invention on the basis of a multi-cylinder engine (six-cylinder engine) with a cylinder head, shown partially in cross-section, including for each cylinder an inlet passage with an inlet valve, an exhaust passage with an exhaust valve and an exhaust gas recirculation passage with an exhaust gas recirculation valve.

To facilitate an understanding of the invention, FIG. 1 shows a cross-section of a cylinder head 10 of a multi-cylinder air compressing charged internal combustion engine. Each cylinder 20 in the cylinder head 10 includes at least one intake passage 30 with an intake valve 40, an exhaust passage 50 with an exhaust valve 60 and an exhaust gas recirculation valve 70 with an exhaust gas recirculation passage 80.

The exhaust passage 50 of each cylinder 20 of the multi-cylinder internal combustion engine is in flow communication with an exhaust gas collection chamber which is not shown but which is known in principle. The collection chamber is in communication with an exhaust gas pipe which includes the usual exhaust gas treating equipment (catalytic converter, particle filter). An exhaust gas recirculation passage 80 which is separate from the exhaust gas passage 50 extends from the exhaust gas passage 50 to the combustion chamber of the cylinder 20 and includes an exhaust gas recirculation valve 70 by which the opening of the recirculation passage 80 can be opened and closed in a controlled manner.

In the arrangement shown, the cylinders 20 of the charged V-six cylinder engine are numbered for each cylinder bank starting at the front end of the engine toward the engine output end as follows: the right cylinder bank comprises the cylinders 1, 2, and 3 and the left cylinder bank comprises the cylinders No. 4, 5, and 6. The right and left cylinder banks have separate exhaust gas collection chambers, so that the exhaust passages of the cylinders No. 1-2-3 are in communication by way of the collection chamber for the right cylinder bank and the exhaust gas passages of the cylinders No. 4-5-6 are in flow communication by way of the exhaust gas collection chamber of the left cylinder bank.

The method according to the invention is based on the understanding that, even with an average exhaust gas pressure which is lower than the average charge air pressure, there are windows in which the exhaust gas pressure substantially exceeds the charge air pressure (exhaust pressure pulse). This is the case at high engine speed and full engine load for example for a time window which starts when the exhaust valve opens at the begin of the exhaust cycle (about 20° crank angle before bottom dead center) and which ends, depending on the engine operating point, about at 30°–160° crank angle thereafter. When exhaust gas recirculation is desired the exhaust gas recirculation valve 70 of a cylinder is then opened in accordance with the invention at the point in time when the exhaust pressure pulse of another associated cylinder reaches the point in its exhaust cycle at which such a high pressure pulse is generated.

By opening the exhaust gas recirculation valve in the cylinder head of a cylinder during the intake cycle the pressure wave of another, if possible adjacent, cylinder can be transmitted to the combustion chamber of the cylinder whose recirculation valve is opened during an intake cycle, whereby the desired exhaust gas recirculation is achieved. The exhaust gas recirculation valve must be open only for the duration of the exhaust gas pressure pulse. At maximum engine speed and high engine load, this is about a 160° crank angle. With falling engine speed the pressure potential and the duration of the exhaust gas pulse based on crank angle also become smaller.

The method according to the invention will now be explained on the basis of two diagrams (FIG. 2 and FIG. 3) for the NO. 4 cylinder of a charged six-cylinder engine. In accordance with the above description the cylinder N.5 which is in the exhaust cycle is associated with cylinder No. 4 which is in the intake cycle.

Figure 2:
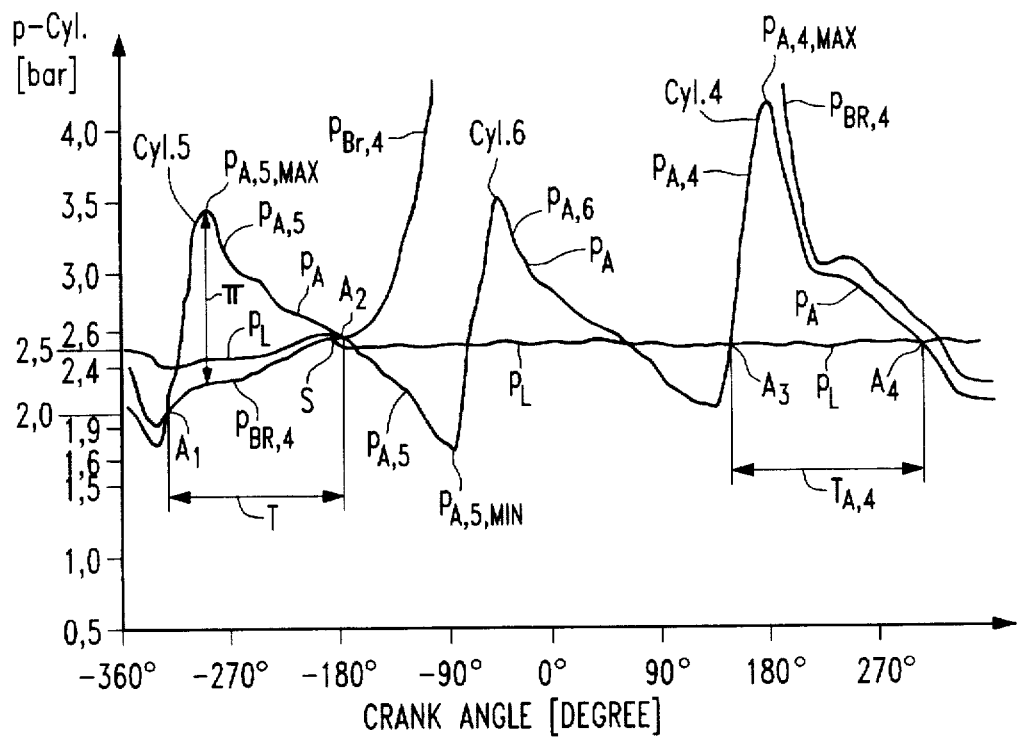
FIG. 2 shows a diagram in which various pressures are given over the crankshaft angle at maximum speed and high engine load of a charged six-cylinder engine, the pressure (combustion chamber pressure, charge air pressure ahead of the cylinder, exhaust gas pressure at the engine exhaust side) being given on the ordinate and the crank angle of the crankshaft being given on the base.

The diagram of FIG. 2 shows the pressure distribution in and at the cylinder No. 4 of the six-cylinder engine for maximum engine speed and high load. On the base, the crank angle of the crankshaft is given in angle degrees and on the ordinate, several pressures measured at, and in, the cylinder No. 4 for a full working cycle are given (2 full crankshaft revolutions). In the given example, the pressure distribution at the intake side (charge air pressure Pin the intake passage 30 of the cylinder head No. 4) and at the discharge side (exhaust gas pressure $P_A$ in the exhaust passage 50 after cylinder No.4) and in the cylinder (combustion chamber pressure $P_{Br}$ in cylinder No. 4) are plotted.

The charge air pressure in the intake passage 30 (see FIG. 1) ahead of the cylinder No. 4 at high load and maximum engine speed is at about 2.4 bar at the beginning of the intake cycle and at about 2.6 bar toward the end of the intake cycle. There are certain fluctuations of the charge air pressure $P_L$ in the intake passage 30 as a result of the opening and closing of the intake valves of cylinder No. 4 particularly during the intake cycle. The combustion chamber pressure $P_{Br}$ (pressure within the cylinders) is during the intake cycle (−360° KW to −180° KW) in which the cylinder is filled, mostly somewhat below the pressure in the intake passage 30, that is at about 1.9 bar at the begin of the intake cycle and at about 2.6 bar toward the end of the intake cycle. When the cylinder is filled the pressure $P_L$ and $P_{Br}$ are the same (intersection S of the two pressure curves of $P_L$ and $P_{Br}$ in FIG. 2).

The exhaust gas pressure curve $P_A$ for the exhaust passage 50 of the cylinder No. 4 shows relatively strong pressure pulsations because of the flow connection between the exhaust passages by way of the exhaust gas collection chamber of the left cylinder bank. As mentioned earlier, the exhaust gas pressure curve PA shows the pressure in the exhaust channel 50 of the cylinder No. 4.

During the intake cycle of cylinder No. 4 cylinder No. 5 is in the exhaust cycle. The exhaust gas pressure wave with the pressure $P_{A5}$ generated upon opening of the exhaust valve of cylinder No. 5 reaches the exhaust passage 50 with little time delay. The pressure peak $P_{A,5,max}$ of the exhaust gas wave which reaches the exhaust channel 50 of the cylinder No. 4 about at the beginning of the intake cycle of the cylinder No. 4, is about 3.5 bar and drops toward the end of the intake cycle of cylinder No. 4 down to about 2.6 bar. At the end of the first half of the compression stroke of cylinder No. 4 down to a minimum exhaust gas pressure $P_{A,5,min}$ of 1.6 bar.

FIG. 2 shows another exhaust gas pressure wave at the cylinder No. 6 (pressure $P_{A,6}$) and the exhaust gas pressure wave of the cylinder No. 4 (pressure $P_{A,4}$) and the exhaust gas pressure wave of the cylinder No. 6, however is not usable for the purpose of exhaust gas recirculation for cylinder No. 4 since at the arrival of the exhaust gas pressure wave from cylinder No. 6, cylinder No. 4 is in its work cycle wherein there is no gas exchange.

The exhaust cycle cylinder No. 4 could be made usable for exhaust gas recirculation in this cylinder if for example there was a connecting passage with a by-pass valve for example between the intake passage 30 and the exhaust passage 50 and an exhaust gas recirculation volume could be stored under the respective pressure in the communication passage so that it could flow into the cylinder with the charge air upon opening of the intake valve.

It is clearly apparent that the pressure peak $P_{A,4,max}$ of the exhaust gas pressure wave of the No. 4 cylinder is higher, by about 0.5 bar, than the pressure peaks $P_{A,5,max}$ and respectively $P_{A,6,max}$ of the No. 5 and No. 6 cylinders. The reason herefor is that the pressure was measured in the exhaust passage 50 of the No. 4 cylinder. Consequently, the pressure peak $P_{A,4,max}$ of the No. 4 cylinder was measured close to its origin whereas the pressure peaks $P_{A,5,max}$ and $P_{A,6,max}$ were measured only after a certain relaxation time which passes between their respective origins at the No. 5 and No. 6 cylinders respectively and the arrival of the corresponding pressure wave in the exhaust passage 50 of the No. 4 cylinder. In this relaxation time, the pressure wave flattens slightly. The duration of the exhaust squall of the No. 4 cylinder is indicated by $T_{A,4}$ and extends between the points of intersection $A_3$ and $A_4$ of the curves $P_A.4$ and $P_L$.

FIG. 2 shows the exhaust gas pressure $P_{A,5}$ originating from No. 5 cylinder as measured in the exhaust passage 50 of the No. 4 cylinder during the intake cycle of the No. 4 cylinder in the time period T which is given by the intersections $A_1$ and $A_2$ of the curve3 for the pressure distribution $P_{Br,4}$ and the curve for the pressure distribution $P_{A,5}$ to be greater than the combustion chamber pressure $P_{Br,4}$ of the No. 4 cylinder. If in this period, the exhaust gas recirculation valve 70 of the No. 4 cylinder is opened, exhaust gas can be recirculated into the No. 4 cylinder.

The exhaust gas recirculation valve 70 is closed when the pressure in the exhaust gas recirculation passage 80 of the No. 4 cylinder becomes lower than the combustion chamber pressure $P_{Br}$ or the charge pressure $P_L$ in the intake passage 30 of the No. 4 cylinder and/or when a certain amount of exhaust gas has been recirculated.

The exhaust gas recirculation for the other cylinders is handled in an analogous manner, wherein, in each case, a cylinder in an intake cycle is associated with a cylinder in an exhaust cycle. As a result, the following correlation for the six cylinder V engine applies (see also FIG. 4):

| Suction Cylinder (intake cycle) | Discharge cylinder (exhaust cycle/flow) |
| --- | --- |
| 1 | 2 |
| 2 | 3 |
| 3 | 1 |
| 4 | 5 (as in the description) |
| 5 | 6 |
| 6 | 4 |

The pressure differential $\Pi$ usable for the exhaust gas recirculation is indicated in FIG. 2 in an exemplary manner for the No. 4 cylinder between $P_{A,5}$ and $P_{Br,4}$.

Figure 3:
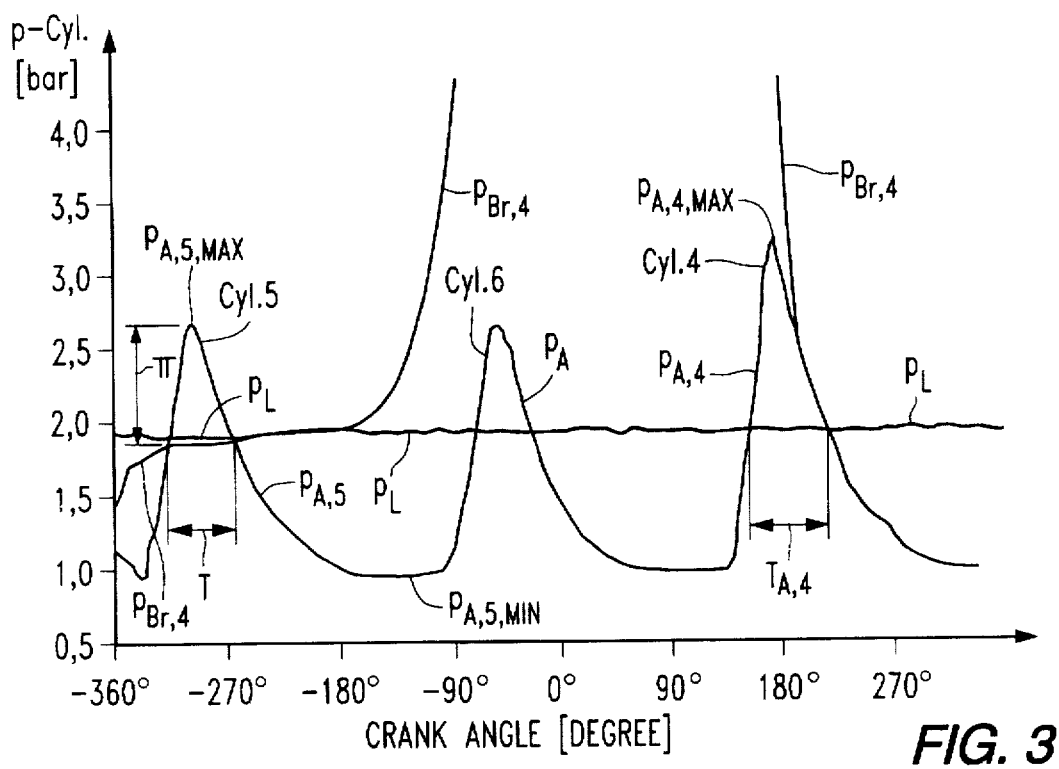
FIG. 3 is a diagram similar to that given in FIG. 2, but giving conditions at medium engine speed at high engine load, and FIG. 4 gives an overview of the relative time sequence of the operating cycles for the various cylinders depending on the crank angle of a valve-six engine on which the exemplary embodiment is based.

FIG. 3 shows a diagram like that of FIG. 2 for an average engine speed at high load of the V6 engine. For similar state curves as in FIG. 2, the same reference numerals are used.

Different to FIG. 2, however, it is apparent that the pressure level is lower and the duration of the exhaust squall $T_{a,4}$ is substantially lower at lower or medium speed and consequently also the time T available for exhaust gas recirculation is shorter.

Figure 4:
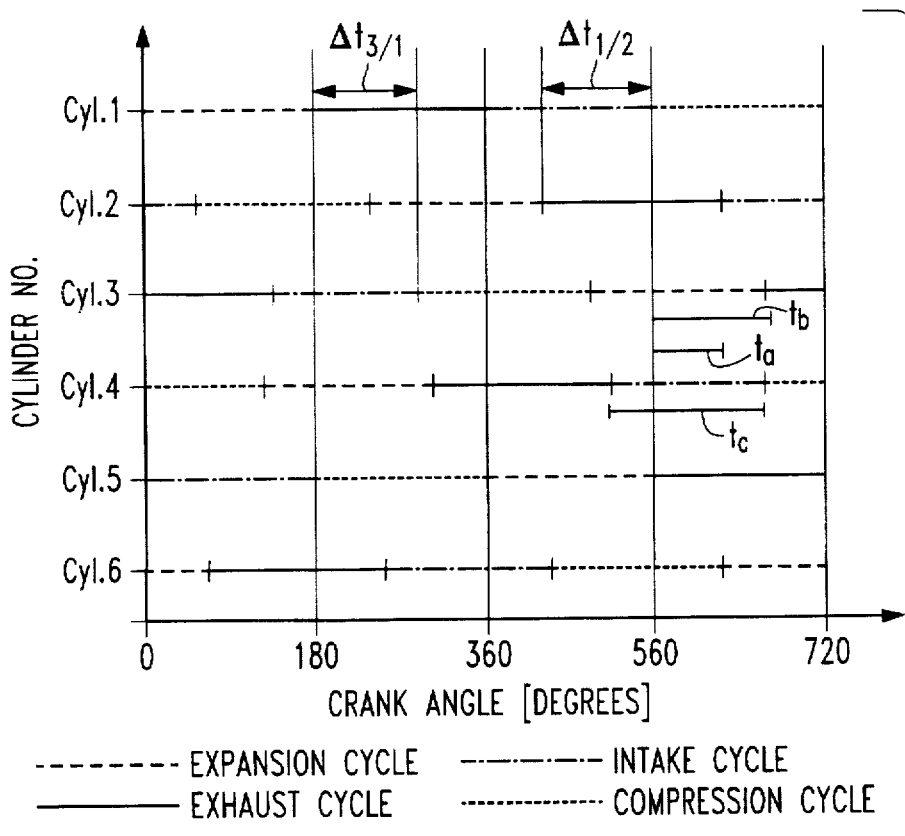

Finally, FIG. 4 shows for the V6 engine given in the example, the time sequence of the operating cycles with respect to the various cylinders depending on the crank angle of the internal combustion engine (firing order of the cylinder; 1-4-2-5-3-6). The time available for the exhaust gas recirculation is given in FIG. 4, as an example, for the No. 4 cylinder dependent on engine speed and load. For example for full load at medium engine speed only a relatively short time $t_a$ is available (based on ° crank angle) for the exhaust gas recirculation. At maximum speed and full load, the time $t_b$ available for exhaust gas recirculation is greater (based on ° crank angle). The maximally available time $t_c$, for exhaust gas recirculation is obtained at maximum engine speed under partial load. In this case, theoretically, the full intake cycle is available.

FIG. 4 also shows the association of the "intaking cylinders" and the "exhausting cylinders". In accordance with the cylinder association given earlier, the intaking cylinder No. 1 is associated with the exhausting cylinder No. 2 for which a time overlap $\Delta t_{1/2}$ of the intake cycle of cylinder No. 2 is necessary. In an analogous manner, the exhausting cylinder No. 1 is associated with the intaking cylinder No. 3 so that a time overlap $\Delta_{3/1}$ of the intake cycle of cylinder No. 3 and the exhaust cycle of the cylinder No. 1 is required. For the other cylinders, there is the time overlap of the intake cycle and the exhaust cycle of the respective associated cylinders in accordance with the cylinder association given earlier.

In another embodiment of the invention, the exhaust gas recirculation valve 70 is controllable depending on a performance graph in which the opening time of the exhaust gas recirculation valve 70 dependent on the load and speed of the engine is recorded. In addition, the exhaust gas recirculation valve 70 may be controllable depending on sensor values of pressure sensors arranged in the intake passage 30 of the No. 4 cylinder and in the exhaust passage of the No. 5 cylinder which is associated with the No. 4 cylinder.

In a preferred embodiment of the invention for multicylinder internal combustion engines wherein several cylinders are concurrently in the exhaust cycle, that exhausting cylinder is associated with the intaking cylinder which has the shortest flow communication passage to the intaking cylinder.

The method according to the invention is of course not limited to air compressing charged internal combustion engines but can be used in a corresponding way with any multi-cylinder internal combustion engine particularly with non-charged air compressing (Diesel) engines or with charged or non-charged gasoline engines.

The exhaust gas recirculation valve may, alternatively to being arranged in the combustion chamber, be arranged in the communication passage which extends in the cylinder head between the exhaust passages and the intake passages of the various cylinders. For the pressure differential between the exhaust side and the intake side, there is, in this case, no longer the combustion chamber pressure $P_{Br}$, important but the charge air pressure $p_L$ in the intake passage which is the determining factor for the exhaust gas recirculation control.

What is claimed is:

1. A method for reducing harmful emission of a multicylinder internal combustion engine which includes, for each cylinder arranged in a cylinder head at least one intake passage with an intake valve, an exhaust passage with an exhaust valve and an exhaust gas recirculation passage extending between an exhaust passage and the interior of a cylinder or its intake passage and including an exhaust gas recirculation valve, said method comprising the steps of:

opening the exhaust recirculation valve associated with a first cylinder during the intake cycle of the first cylinder at the beginning of the exhaust cycle of a second cylinder associated with the first cylinder and closing the exhaust gas recirculation valve when the exhaust gas pressure in the exhaust gas recirculation passage to said first cylinder falls below the combustion chamber pressure of the first cylinder or a charge air pressure in its intake passage and when a predetermined amount of exhaust gas has been recirculated.

2. A method according to claim 1, wherein said exhaust gas recirculation valve is controlled depending on a performance graph in which particular opening periods of the exhaust gas recirculation valve depending on engine load and engine speed are recorded.

3. A method according to claim 1, wherein said exhaust gas recirculation valve is controlled depending on sensor data provided by pressure sensors arranged in the intake passage of the first cylinder and in the exhaust passage of the second cylinder which is associated with the first cylinder.

4. A method according to claim 1, wherein in a multicylinder internal combustion engine in which several cylinders are concurrently in an exhaust cycle, a cylinder is selected of the several cylinders as the exhausting second cylinder which is associated with the intaking first cylinder which has the shortest flow communication connection to the exhaust gas recirculation valve of the first cylinder.

* * * * *